United States Patent Office 3,231,613
Patented Jan. 25, 1966

3,231,613
N,N-DI(2-PROPYNYL) 5-(2-PROPYNYLOXY)-1-NAPHTHYLAMINE
Chester E. Pawloski, Bay City, Mich., assignor to The Dow Chemical Company, Midland, Mich., a corporation of Delaware
No Drawing. Filed Dec. 26, 1963, Ser. No. 333,677
1 Claim. (Cl. 260—574)

The present invention is directed to a compound corresponding to the formula

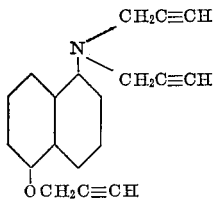

This compound is a dark solid which is somewhat soluble in many organic solvents and of low solubility in water. The compound has been found to be useful as a pesticide for the control of various insect, fish, worm, bacterial, and fungal organisms such as roundworms, beetles, roaches, blight and minnows.

The new compound can be prepared by reacting 5-amino-1-naphthol with propargyl halide such as propargyl bromide or propargyl chloride. The reaction is carried out in the presence of a basic material such as an alkali metal carbonate and preferably in a liquid reaction media such as isopropanol, acetone, or methyl ethyl ketone. The reaction takes place smoothly at temperatures at which halide of reaction is produced and preferably at temperatures of from about 0 to 100° C. The halide of reaction appears in the reaction mixture as a salt of the metal cation from the employed base. Good results are obtained when employing one molecular portion of 5-amino-1-naphthol, greater than one molecular proportion, and preferably an excess, of each of propargyl halide and basic material. The reaction consumes the reactants in the proportion of 3 moles each of propargyl halide and the basic material for every mole of 5-amino-1-naphthol and the use of the reactants in amounts which represents such proportions is preferred when optimum yields are desired. Upon completion of the reaction the desired product can be separated and purified by conventional procedures.

In carrying out the reaction the propargyl halide, 5-amino-1-naphthol and basic material can be combined in any convenient fashion. However, it is preferable to disperse the reactants in a liquid medium with stirring. Following the contacting, the reaction mixture is maintained at the contacting temperatures for a period of time to insure completion of the reaction. The reaction mixture can be filtered to remove the halide of reaction and the filtrate used in pesticidal compositions or the filtrate can be further purified by conventional procedures. In a preferred procedure, the hot reaction mixture is combined with aqueous alkali metal hydroxide and heated for a short period. The alkali metal hydroxide converts any unreacted starting materials to water soluble salts which can then be removed by washing the reaction mixture with water. The organic layer, obtained during the washing procedure, can be further purified by drying with a deliquescent material and by heating the dried material to remove the low boiling constituents.

In a representative operation, 5-amino-1-naphthol (25 grams), propargyl bromide (60 grams), and potassium carbonate (67 grams) where dispersed in 500 milliliters of acetone, and the resulting mixture heated with stirring at the boiling temperature and under reflux for twenty-four hours. The reaction mixture was then combined with a solution of 30 grams of sodium hydroxide dissolved in 90 milliliters of water and heated for another four hours. Following the heating period, the reaction mixture was filtered while warm to remove the halide of reaction. The organic product layer which separated in the filtrate was collected by decantation and dried over calcium chloride. The dried mixture was then heated to remove the low boiling constituents and obtain the N,N-di(2-propynyl) 5 - (2 - propynyloxy) - 1 - napthylamine product as a liquid residue. This product solidified upon standing. The solid product melted at 71–74° C.

The novel product of the present invention is useful as a pesticide for the control of the growth and killing of many plant and animal species. For such uses, the product is dispersed on an inert finely divided solid and employed as a dust. Such mixtures also may be dispersed in water with or without the aid of a surface active agent, and the resulting aqueous suspension employed as sprays. In other procedures, the product is employed as an active constituent in solvent solutions, oil-in-water or water-in-oil emulsions, or aqueous dispersions. In representative operations, excellent kills of carp minnows are obtained when the minnow's environment contains 5 parts per million by weight of N,N-di(2-propynyl) 5-(2-propynyloxy)-1-naphthylamine.

I claim:
N,N - di(2 - propynyl) 5-(2-propynyloxy)-1-naphthylamine.

No references cited

CHARLES B. PARKER, *Primary Examiner.*